United States Patent
Ghosh et al.

(10) Patent No.: US 10,509,653 B2
(45) Date of Patent: Dec. 17, 2019

(54) VECTOR PROCESSING SYSTEM

(71) Applicant: INTEL CORPORATION, Santa Clara, CA (US)

(72) Inventors: Somnath Ghosh, San Jose, CA (US); Pratik J. Ashar, Mumbai (IN)

(73) Assignee: INTEL CORPORATION, Santa Clara, CA (US)

( * ) Notice: Subject to any disclaimer, the term of this patent is extended or adjusted under 35 U.S.C. 154(b) by 189 days.

(21) Appl. No.: 15/429,520

(22) Filed: Feb. 10, 2017

(65) Prior Publication Data

US 2018/0232229 A1 Aug. 16, 2018

(51) Int. Cl.
  *G06F 9/45* (2006.01)
  *G06F 9/30* (2018.01)
  *G06F 8/41* (2018.01)
  *G06F 8/52* (2018.01)
  *G06F 9/455* (2018.01)

(52) U.S. Cl.
  CPC .......... *G06F 9/30036* (2013.01); *G06F 8/445* (2013.01); *G06F 8/447* (2013.01); *G06F 8/4441* (2013.01); *G06F 8/52* (2013.01); *G06F 9/45525* (2013.01)

(58) Field of Classification Search
  CPC .......... G06F 8/40–8/54; G06F 9/30036; G06F 9/3885–3891
  USPC ................................. 712/2–22; 717/136–161
  See application file for complete search history.

(56) References Cited

U.S. PATENT DOCUMENTS

| | | | | |
|---|---|---|---|---|
| 5,386,570 A * | 1/1995 | Lindhorst | ............... | G06F 8/427 717/142 |
| 2007/0233766 A1* | 10/2007 | Gschwind | ........... | G06F 9/30032 708/490 |
| 2007/0300210 A1* | 12/2007 | Haraguchi | ............ | G06F 8/4442 717/136 |
| 2008/0141012 A1* | 6/2008 | Yehia | .................. | G06F 9/30036 712/226 |
| 2011/0145543 A1* | 6/2011 | Damron | .............. | G06F 9/30014 712/3 |
| 2011/0145654 A1* | 6/2011 | Dressler | .................. | G06F 8/443 714/39 |

(Continued)

OTHER PUBLICATIONS

Nuzman et al. "Vapor SIMD: Auto-Vectorize Once, Run Everywhere", 2011, CGO '11 Proceedings of the 9th Annual IEEE/ACM International Symposium on Code Generation and Optimization, pp. 151-160.*

(Continued)

*Primary Examiner* — Jue Louie
(74) *Attorney, Agent, or Firm* — Finch & Maloney PLLC (57) ABSTRACT

Vector processing systems and methods disclosed herein generate efficient vector initialization code that leverages performance advantages of single instruction, multiple data (SIMD) instructions and immediate operands. In some embodiments, a vector processing system scans existing code for initialization syntax that specifies values which match one or more target patterns. Where the vector processing system identifies one or more of these target patterns within the specified values, the vector processing system generates enhanced vector initialization code. This enhanced vector initialization code is configured to outperform vector initialization code that sequentially loads discrete values to discrete channels within a vector register.

22 Claims, 4 Drawing Sheets

(56) References Cited

U.S. PATENT DOCUMENTS

| | | | |
|---|---|---|---|
| 2012/0079469 A1* | 3/2012 | Gonion | G06F 8/433 717/160 |
| 2013/0185703 A1* | 7/2013 | Davis | G06F 8/41 717/140 |
| 2016/0011873 A1* | 1/2016 | Plotnikov | G06F 9/30145 712/205 |
| 2018/0157470 A1* | 6/2018 | Matsuura | G06F 8/447 |

OTHER PUBLICATIONS

Motorola, "AltiVec Technology Programming Interface Manual", 1999, chapter 1-2, retrieved from: https://web.archive.org/web/20050509092416/http://math-atlas.sourceforge.net/devel/assembly/ALTIVECPIM.pdf.*

Munshi et al. "Programming with OpenCL C", 2011, InformIT.com, retrieved from: http://www.informit.com/articles/article.aspx?p=1732873.*

* cited by examiner

VECTOR PROCESSING SYSTEM

BACKGROUND

An instruction set architecture (ISA) specifies data storage and manipulation operations executable by processor hardware and includes a well-defined set of machine language instructions that can be used to invoke these operations. Machine language instructions included within an ISA may command processor hardware to retrieve or store data in a register or other memory, execute arithmetic and/or logic operations on the data, control coprocessor operations, and/or control the order in which instructions are executed.

DETAILED DESCRIPTION

Vector processing systems and methods disclosed herein generate efficient vector initialization code that leverages performance advantages of SIMD instructions and immediate operands. For instance, in some embodiments, a vector processing system scans existing code for initialization syntax that specifies values which match one or more target patterns. Where the vector processing system identifies one or more of these target patterns within the specified values, the vector processing system generates enhanced vector initialization code. This enhanced vector initialization code is configured to outperform vector initialization code that sequentially loads discrete values to discrete channels within a vector register.

In some embodiments, the initialization syntax includes any code that commands a processor to load a data structure with a plurality of values. Like other portions of a program, initialization syntax may be coded at any of a variety of levels of abstraction ranging from human readable source code to machine instructions. For instance, in some embodiments, the initialization syntax is part of a program coded in human readable source code (e.g., a program written in C++). In other embodiments, the initialization syntax is part of a program compiled into object code. In still other embodiments, the initialization syntax is part of a program compiled and linked into an executable program.

In some embodiments, the target patterns of values specified within the initialization syntax include arithmetic progressions, a set of values distributed within a limited range of a base value, repeating values, and two or more values, each of which is representable with fewer bits than the number of bits available to store a discrete value in a vector data store, such as a vector register. Where the vector processing system identifies values that form an arithmetic progression, the vector processing system generates enhanced vector initialization code by executing the following actions. First, the vector processing system identifying a base value of the progression. Next, the vector processing system calculates incremental values between the base value and each value in the progression. Next, the vector processing system generates code to load the incremental values, in parallel, into a data store. Finally, the vector processing system generates code to add the base value to each incremental value.

Where the vector processing system identifies values that form a set of values distributed within a limited range of a base value, the vector processing system generates enhanced vector initialization code by executing the following actions. First, the vector processing system calculates a base value, such as a mean value, of the set. Next, the vector processing system calculates offsets between the base value and each value in the set. Next, the vector processing system generates code to load the offsets, in parallel, into a data store. Finally, the vector processing system generates code to add the base value to each offset.

Where the vector processing system identifies repeating values, the vector processing system generates enhanced vector initialization code by executing the following actions. First, the vector processing system identifies the presence of a plurality of equal values and one or more variant values within an ordered set of values specified within the initialization syntax. Next, the vector processing system determines one or more locations of the one or more variant values relative within the ordered set. Next, the vector processing system generates code that loads the equal values, in parallel, into each of a plurality of fields within a data store. Finally, the vector processing system generates code to load the one or more variant values into the data store at locations that correspond to the one or more previously determined locations.

Where the vector processing system identifies values that are each representable with fewer bits than the number of bits are available to store a discrete value in the vector data store targeted for initialization, the vector processing system generates enhanced vector initialization code by executing the following actions. First, the vector processing system packs each of the identified values into one or more data sequences with other identified values, such that the size of each of the data sequences is less than or equal to the number of bits available. Next, the vector processing system generates code that moves each of the data sequences into a corresponding field of the data store.

In some embodiments, the vector code generator is incorporated within a compiler that receives source code and generates object code. In these embodiments, the object code generated by the compiler includes enhanced vector initialization code. In some embodiments, the vector code generator receives and scans the source code to generate the enhanced vector initialization code. In other embodiments, the vector code generator receives and scans object code generated by the compiler to generate the enhanced vector initialization code. In some embodiments, the vector code generator is a discrete component within the overall vector processing system.

Different ISAs may include different instructions with different data manipulation capabilities. With this fact in mind, it is appreciated that the particular instructions included the enhanced vector initialization code in any given example are dependent upon the instructions available within the ISA to which the enhanced vector initialization code is targeted. Some ISAs may provide particular SIMD instructions that can be advantageously utilized to generate enhance vector initialization code. Consequently, the code generation techniques described herein are not limited to the instructions of a particular ISA but rather are intended to be used in conjunction with any ISA that supports SIMD instructions with immediate operands.

Still other aspects, embodiments and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. References to "an embodiment," "other embodiments," "an example," "some embodiments," "some examples," "an alternate embodiment," "various embodiments," "one embodiment," "at least one embodiment," "another embodiment," "this and other embodiments" or the like are not necessarily mutually exclusive and are intended to indicate that a particular feature, structure, or characteristic described in connection with the embodiment or example may be included in at least one embodiment or example. The appearances of such terms herein are not necessarily all referring to the same embodiment or example. Any embodiment or example disclosed herein may be combined with any other embodiment or example.

Also, the phraseology and terminology used herein is for the purpose of description and should not be regarded as limiting. Any references to examples, embodiments, components, elements, or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

General Overview

Machine instruction width is conventionally limited to between 32 and 64 bits. Consequently, the width available for an immediate included within an instruction is also conventionally limited to between 32 and 64 bit. In an SISD instruction, this width is sufficient to represent a wide range values in an immediate because a substantial portion of the width can be devoted to representation of a single value. However, in an SIMD instruction, this width is insufficient to represent a wide range of values because the width must be partitioned into distinct groups of bits (e.g., one group for each channel), which results in a smaller range of representable values for each channel. For instance, for a 32 bit SIMD instruction each channel may correspond to a group of 4 bits and so each group may represent signed integer values only between −8 and 7. One example of this situation is illustrated by Table 1. Table 1 depicts the contents of a vector register identified as vector_register_1 after execution of the following 32 bit SIMD move instruction:

SIMD_mov vector_register_1 0x321570f4:vector

TABLE 1

| | | Bits: | | | | | | |
|---|---|---|---|---|---|---|---|---|
| | | 31 28 | 27 24 | 23 20 | 19 16 | 15 12 | 11 8 | 7 4 | 3 0 |
| Values: | | 3 | 2 | 1 | 5 | 7 | 0 | −1 | 4 |
| Channels: | | Ch-7 | Ch-6 | Ch-5 | Ch-4 | Ch-3 | Ch-2 | Ch-1 | Ch-0 |

Each column in Table 1 associates corresponding bit groups, values, and channels. Each entry in the "Bits" row identifies a bit group corresponding to a channel identified by the entry in the "Channel" row. Additionally, each entry in the "Values" row identifies a signed integer value corresponding to and specified by the bit group identified by the entry in the "Bits" row.

As illustrated by Table 1, loading a sequence of arbitrary values residing outside a narrow range using a single conventional SIMD mov instruction is not possible. For example, a single conventional SIMD mov instruction cannot be used to load the arbitrary values of {40, 38, 40, 41, 38, 40, 38, 40} to a vector register because the conventional SIMD mov instruction can only load 8 groups of 4 bits due to its limited width. This shortcoming may be overcome by loading each of the values with a separate SISD instructions, but loading a vector register using SISD instructions is inefficient compared to loading a vector register using SIMD instructions.

System Architecture

Figure 1:
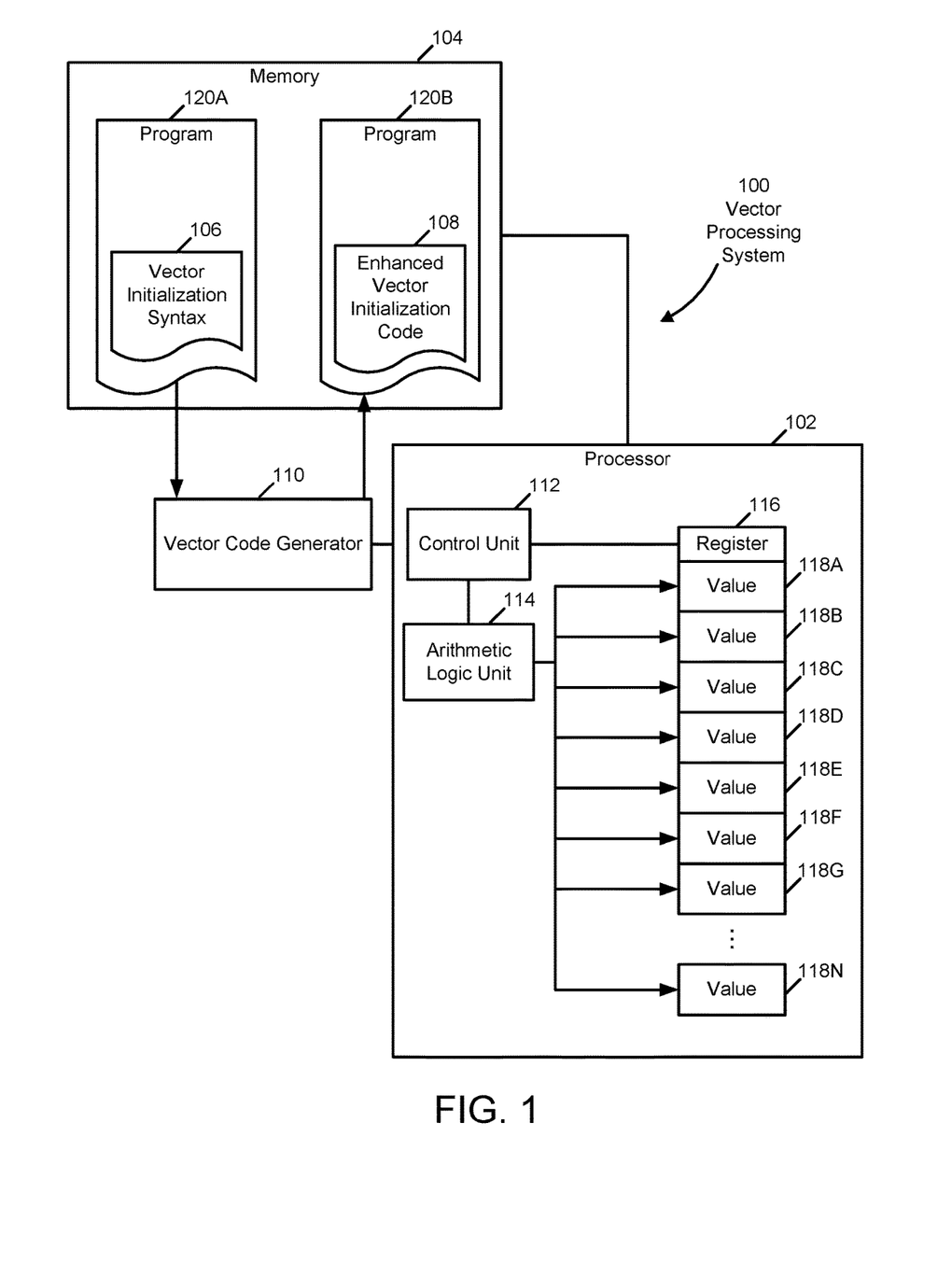
FIG. 1 illustrates a vector processing system configured in accordance with an embodiment of the present disclosure.

FIG. 1 illustrates a vector processing system 100 implemented by a computing device that includes a vector code generator 110 and a processor 102 coupled to a memory 104. The memory 104 may include volatile and/or non-volatile data storage (e.g., read-only memory, random access memory, flash memory, magnetic/optical disk, and/or some other computer readable and writable medium) that is readable and/or writable by the processor 102. The memory 104 is sized and configured to store programs to be executed by the processor 102 and at least some of the data used by the programs during execution. As shown in FIG. 1, these programs may include a program 120A and/or a program 120B. The program 120A includes vector initialization syntax 106, and the program 120B includes enhanced vector initialization code 108. The processor 102 includes a control unit 112, an arithmetic logic unit (ALU) 114, and a vector register 116. The vector register 116 includes channels 118A through 118N, which are collectively referred to herein as the channels 118. As shown in FIG. 1, each of the channels 118 is sized and configured to store a corresponding value. In at least one embodiment, there are 8 channels in total and the size of each of the channels is 32 bits. Other embodiments may have differing numbers of channels and difference channels sizes. Thus, the embodiments disclosed herein are not limited to a specific number of channels or a specific channel size.

The control unit 112 is coupled to the ALU 114 and the vector register 116. The control unit 112 receives machine instructions (e.g. from the memory 104) and controls execution of the machine instructions via the ALU 114. The ALU 114 is coupled to the control unit 112 and the vector register 116. The ALU 114 receives machine instructions from the control unit 112 and executes these instructions. As explained above, machine instructions may include immediates and non-immediates. Thus, the ALU 114 may, when executing instructions with non-immediates, may access registers or other memory to retrieve values stored therein. Upon completing execution of a machine instruction, the ALU 114 stores generated output in a register or other memory. As illustrated in FIG. 1, where the machine instruction executed by the ALU 114 is a SIMD instruction, the ALU 114 stores generated output in the vector register 116 as a plurality of values within the channels 118.

In some embodiments, the vector code generator 110 is configured to receive the program 120A from the memory 104, to identify vector initialization syntax 106 within the program 120A, to generate enhanced vector initialization code 108, and to store the enhanced vector initialization code 108 within the program 120B. Examples of the code generation processes that the vector code generator 110 is configured to execute in some embodiments are described further below with reference to FIGS. 2 and 3. In some embodiments, the vector code generator 110 is implemented as a software component that is executable by the processor 102. In other embodiments, the vector code generator 110 is implemented as a special purpose circuit, such as an application specific integrated circuit or field programmable gate array, that is coupled to and controllable by the processor 102.

The programs 120A and 120B may include sequences of instructions coded at various levels of abstraction. For instance, in some examples, the programs 120A and 120B are coded in human readable source code, such as C++, Java, JavaScript, or Assembler. In other examples, the programs 120A and 120B are object code generated by a compiler. In still other examples, the programs 120A and 120B are coded in machine language instructions. Additionally or alternatively, the programs 120A and 120B may be coded at different levels of abstraction. For instance, in some examples, the program 120A is coded in human readable source code and the program 120B is coded in machine instructions.

In one example, the program 120B includes a sequence of machine instructions. In this example, during execution of the program 120B, the control unit 112 loads each of these machine instructions, including the enhanced vector initialization code. After loading each machine instruction, the control unit 112 signals the ALU 114 to execute the machine instruction. When the ALU 114 executes the enhanced vector initialization code, the ALU loads each of the channels 118 with a corresponding value, as illustrated in FIG. 1. The values loaded in this manner may represent coefficients of filter kernels, distance thresholds of video estimation kernels, offsets for indirect gather/scatter operations, and the like.

Methodology

Figure 2:
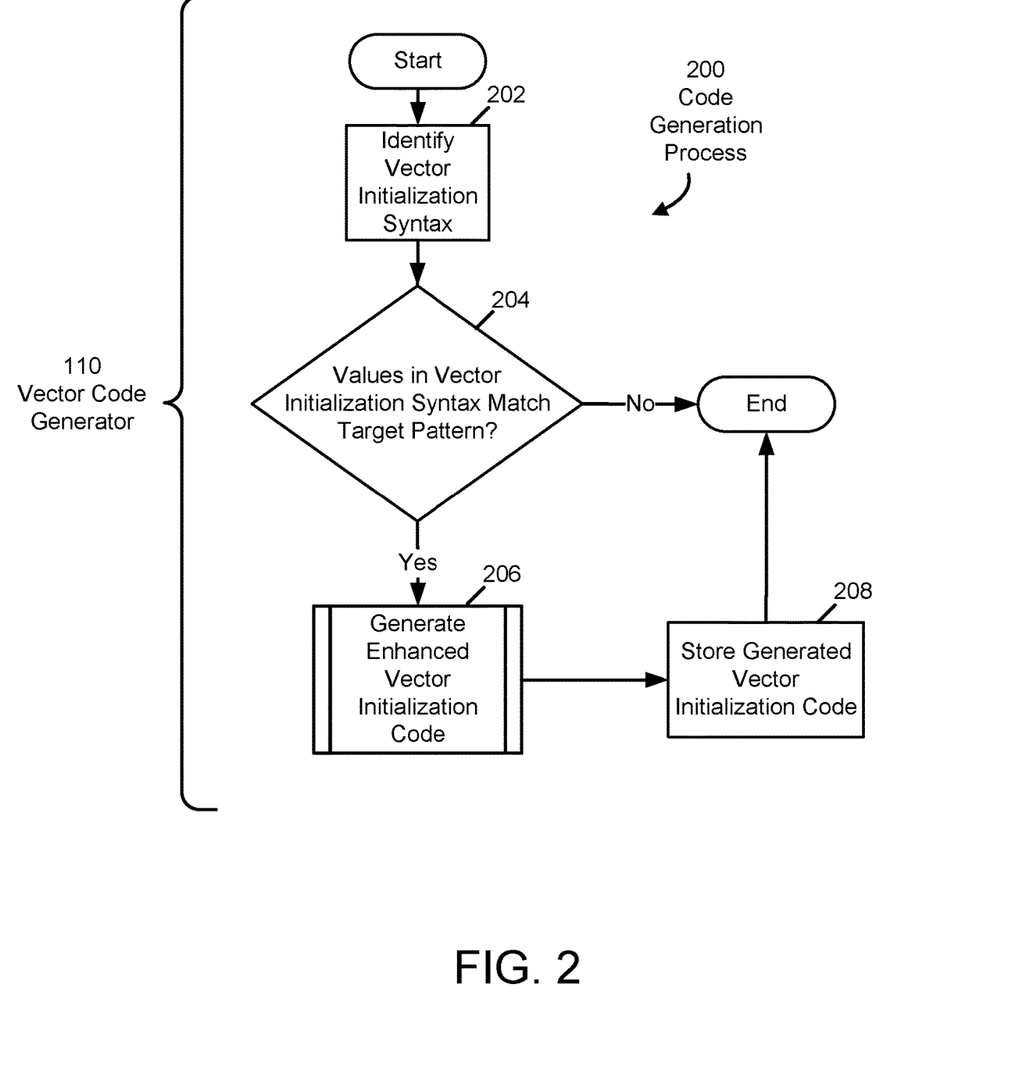
FIG. 2 illustrates a vector initialization enhancement process in accordance with an embodiment of the present disclosure.

According to some embodiments, a vector processing system, such as the vector processing system 100, executes processes that generate enhanced vector initialization code, such as the vector initialization code 108. FIG. 2 illustrates a code generation process 200 in accord with these embodiments. As shown in FIG. 2, the code generation process 200 includes several acts that, in combination, enable the vector processing system to generate, and ultimately execute, enhanced vector initialization code that leverages performance advantages of immediates and SIMD instructions.

In some embodiments, the code generation process 200 is executed by a vector code generator, such as the vector code generator 110. The code generation process 200 starts in act 202 with the vector code generator scanning a program, such as the program 120A, for initialization syntax. Initialization syntax includes any code that commands a processor to load a data structure with a plurality of values. Like other portions of the program, initialization syntax may be coded at any level of abstraction ranging from human readable source code to machine instructions. For instance, the following example of initialization syntax is coded to store values from 0 to 15 in an array of unsigned integers named initUDValues and to initialize a 16-channel vector of unsigned integers the initUDValues array.

--- unsigned int initUDValues[ ] = {0, 1, 2, 3, 4, 5, 6, 7, 8, 9, 10, 11, 12, 13, 14, 15};
vector<unsigned int, 16> constants(initUDValues);

---

In another example, initialization syntax is coded to load values ranging from 0 to 7 in an array of 8-bit integers named initVals. This example initialization syntax follows.

int8 initVals[ ]={0,1,2,3,4,5,6,7};

In another example, initialization syntax is coded to store values ranging from 0 to 15 in an array of unsigned integers name initUDValues and to initialize a 16-channel vector register using the initUDValues array. This example initialization syntax, which is coded at a lower level of abstraction than the previous two examples (i.e., in Assembly code), follows.

--- global initUDValues unsigned int array n_elems = 16 {0, 1, 2, 3, 4, 5, 6, 7, 8, 9, 10, 11, 12, 13, 14, 15}
...
kernel void foo(void)
{
    ...
    mov16int constants, &initUDValues
    ...
}

---

In act 204, the vector code generator identifies the values coded within the initialization syntax and compares the values to one or more target value patterns that the vector code generator is configured to enhance. Where the vector code generator matches the identified values to one or more of the target value patterns, the vector code generator executes act 206. Where the vector code generator fails to match the identified values to any of the one or more target value patterns, the vector code generator terminates the code generation process 200. Examples of the one or more target patterns and the processes executed to identify them within the act 204 are described further below with reference to FIG. 3.

In the act 206, the vector code generator generates enhanced vector initialization code based on the value and the target value pattern identified in the act 204. Examples of the processes executed to generate the enhanced vector initialization code within the act 206 are described further below with reference to FIG. 3. In act 208, the vector code generator stores the enhanced vector initialization code at a target data storage location, e.g., within the program 120B in the memory 104. After execution of the act 208, the vector code generator terminates the code generation process 200.

Figure 3:
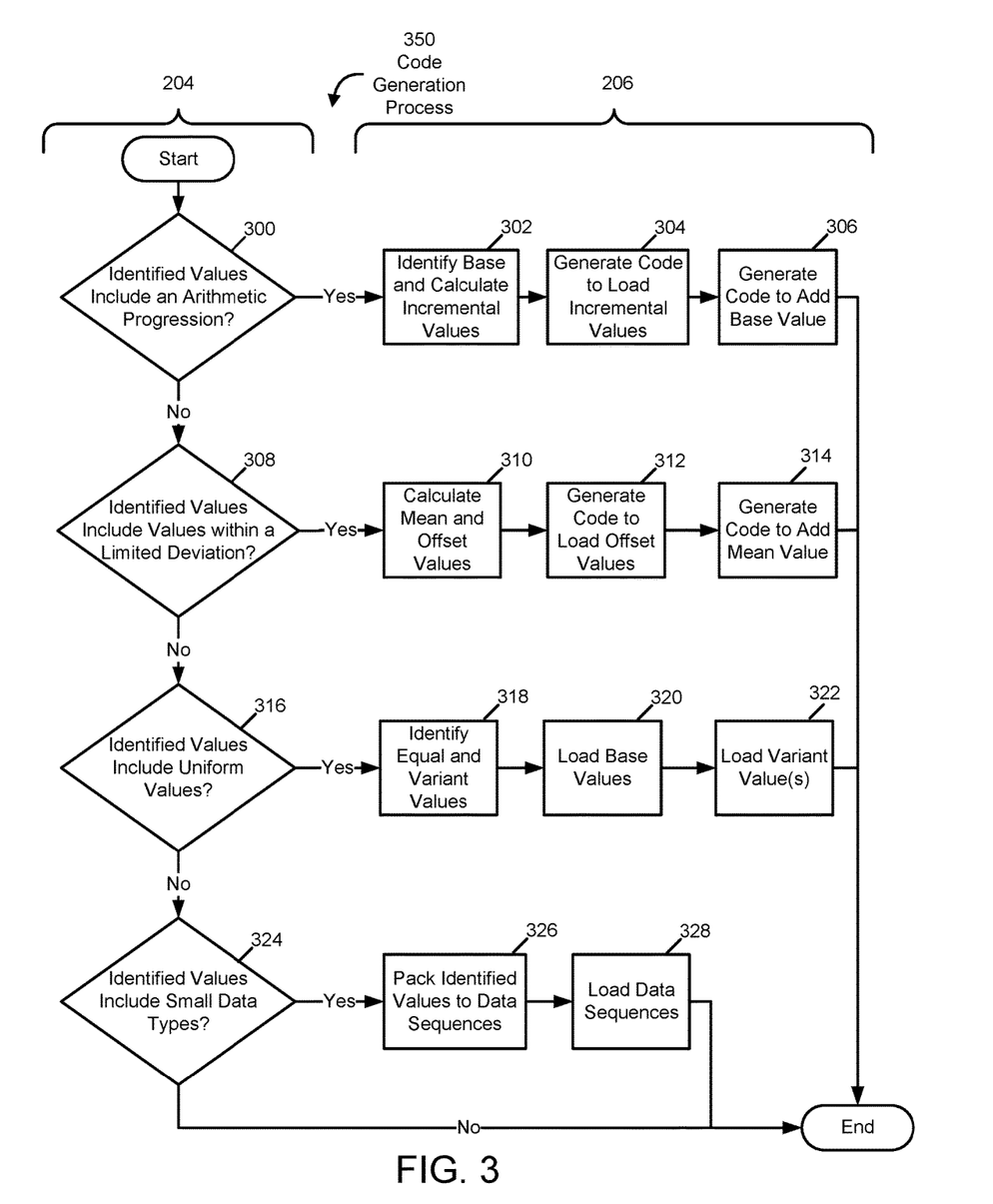
FIG. 3 illustrates an enhanced vector initialization code generation process in accordance with an embodiment of the present disclosure.

In some embodiments, the acts 204 and 206 may be implemented using any one or more of several target value patterns and associated code generation processes. FIG. 3 illustrates some of these target value patterns and associated code generation processes within a code generation process 350 that combines the acts 204 and 206. As shown, one or more of the acts 300, 308, 316, and 324 may be implemented within the act 204, and one or more of the associated acts 302, 304, 306, 310, 312, 314, 318, 320, 322, 326, 328 may be implemented within the act 206. For instance, in one embodiment, the act 204 is implemented using the acts 300 and 308 and the act 206 is implemented using the acts 302, 304, 306, 310, 312, and 314.

The code generation process 350 illustrated in FIG. 3 starts in the act 300 with the vector code generator determining whether the values identified within the initialization syntax include an arithmetic progression. This may be accomplished, for example, by calculating differences between each consecutive value and identifying that these differences have equal values. If the identified values include an arithmetic progression of a threshold size (e.g., 3 or more values), the vector code generate executes the act 302. Otherwise, the vector code generator executes the act 308.

In the act 302, the vector code generator identifies a base value of the arithmetic progression, i.e., a value from which the remainder of the identified values are offset, and incremental values that are the difference between the base value and the identified values. In some examples, the base value is the upper or lower bound of the progression. In other examples, the base value is the mean or mode of the progression. In the act 304, the vector code generator generates code to load the incremental values into a vector register. In the act 306, the vector code generator generates code to add the base value to the incremental values in the vector register, thereby generating code to initialize a vector register with as few as two SIMD instructions.

In one example, where the identified values are {50, 51, 52, 53, 54, 55, 56, 57}, the vector code generator identifies, within the act 300, the identified values as an arithmetic progression with a step size of 1. Responsive to identifying the arithmetic progression, the vector code generator executes the act 302. In the act 302, the vector code generator identifies the base value of the arithmetic progression as 50 and the incremental values as 0-7. Within the act 304, the vector code generator generates code to load an 8-channel vector register with the incremental values. One example of this code includes the following instruction.

mov8int VecReg1 0x7654321:v8

Within the act 306, the vector code generator generates code to add the base value 50 to the 8 values currently stored in the vector register. One example of this code includes the following instruction.

add8int VecReg1 VecReg1 50

When executed, this generated code initializes VecReg1 with the identified values of {50, 51, 52, 53, 54, 55, 56, 57}.

Where the arithmetic progression includes a number of identified values that is larger than the number of channels with a single vector register, the vector code generator may, within the act 306, generate additional code to initialize more than one vector register. Expanding on the arithmetic progression example described above, assume the identified values are {50, 51, 52, 53, 54, 55, 56, 57, 58, 59, 60, 61, 62, 63, 64, 65, 66, 67} and that the processor 102 includes at least 3 vector registers. In this example, the vector code generator generates additional code to load two vector registers with the identified values {58, 59, 60, 61, 62, 63, 64, 65, 66, 67}. One example of this code includes the following instructions.

add8int VecReg2 VecReg1 8
add2int VecReg3 VecReg2 8

When executed, this generated code initializes VecReg2 with the identified values of {58, 59, 60, 61, 62, 63, 64, 65} and initializes VecReg3 with the identified values of {66, 67}.

It is appreciated that, in some examples, the step size of the arithmetic progression may be a constant value other than 1. In these examples, the instruction to load the 8-channel vector may be altered to account for the increased step size. Additionally or alternatively, constant and/or variable step sizes other than 1 may be accounted for by introducing intermediate code between the load instruction and the addition instruction that alters the values in the vector register to reach the incremental values calculated in the act 302.

In the act 308, the vector code generator determines whether the values identified within the initialization syntax reside within a limited range. In some embodiments, the size of the limited range is based on the range of vector channel values representable within an immediate. For instance, where 4 bits are available to represent each vector channel value within an immediate, the limit of the range of identified values is 15. If vector code generator determines that the identified values reside within the limited range, the vector code generator executes the act 310. Otherwise, the vector code generator executes the act 316.

In the act 310, the vector code generator calculates a mean value (e.g., actual mean, rounded mean, or truncated mean) of the limited range and offset values that are the difference mean value and the identified values. In the act 304, the vector code generator generates code to load the mean value into each channel of a vector register. In the act 306, the vector code generate generates code to add the offset values to the base values in the vector register, thereby generating code to initialize a vector register with as few as one SIMD instruction.

In one example, where the identified values are {10, 12, 14, 15, 16, 20, 19, 18}, the vector code generator calculates, within the act 308, the range of the identified values as having a value of 10. Also, within the act 308, the vector code generator compares 10 to the range limit, which is 15 in this example. Responsive to the range being less than the range limit, the vector code generator executes the act 310. In the act 310, the vector code generator calculates the mean value of the identified values as 15 and offset values as {−5, −3, −1, 0, 1, 5, 4, 3}. Within the act 304, the vector code generator generates code to load an 8-channel vector register with the mean value. One example of this code includes the following instruction.

mov8int VecReg1 0xbdf01543:v8

Within the act 306, the vector code generator generates code to add the mean value 15 to the 8 values currently stored in the vector register. One example of this code includes the following instruction.

add8int VecReg1 VecReg1 15

When executed, this generated code initializes VecReg1 with the identified values of {10, 12, 14, 15, 16, 20, 19, 18}.

Where the instruction set of the processor 102 supports an add instruction with two immediates, the two instructions described above can be replaced with a single instruction. One example of this instruction follows.

```
add8int VecReg1 0xbdf01543:v8 15
```

In the act 316, the vector code generator determines whether the values identified within the initialization syntax include more than a threshold number of equal values (e.g., 3). If vector code generator determines that the identified values reside include the threshold number of equal values, the vector code generator executes the act 318. Otherwise, the vector code generator executes the act 324.

In the act 318, the vector code generator identifies the equal values, one or more variant values, and one or more positions of the one or more variant values within the identified values. In the act 320, the vector code generator generates code to load the equal value into each channel of a vector register. In the act 322, the vector code generator generates code to load the one or more variant values to vector register channels corresponding to the one or more positions, thereby generating code to initialize a vector register with as few as two SIMD instructions.

In one example, where the identified values are {500, 500, 500, 500, 0, 500, 500, 500}, the vector code generator identifies, within the act 316, 7 values that are equal. Also, within the act 316, the vector code generator compares 7 to the threshold number of equal values, which is 3 in this example. Responsive to the number of equal values being more than the threshold number, the vector code generator executes the act 318. In the act 318, the vector code generator identifies the equal value as being 500, the variant value as being 0, and the position of the variant value as being $3^{rd}$ from the right. Within the act 320, the vector code generator generates code to load the equal value to all of the vector register channels of an 8-channel vector register. One example of this code includes the following instruction.

```
mov8int VecReg1 500:d
```

Within the act 322, the vector code generator generates code to move the variant value 0 to the third channel the vector register. One example of this code includes the following instruction.

```
mov1int VecReg1.3 0:d
```

When executed, this generated code initializes VecReg1 with the identified values of {500, 500, 500, 500, 0, 500, 500, 500}.

In the act 324, the vector code generator determines whether the values identified within the initialization syntax are of a data type that is of smaller size than the size of channels of a vector register. If vector code generator determines that the size of the data type is less than the size of the vector register channels, the vector code generator executes the act 326. Otherwise, the vector code generator terminates the code generation process 350.

In the act 326, the vector code generator packs (e.g., concatenates) the identified values to into one or more data sequences that are each equal in size to the size of the vector register channels. In the act 328, the vector code generator generates code to load each of the one or more data sequences into each channel of a vector register, thereby generating code to initialize each vector register channel with multiple identified values.

In one example, where the identified values are the following set of unsigned chars {0xa, 0x6e, 0x14, 0x78, 0x1e, 0x82, 0x28, 0x8c}, the vector code generator determines, within the act 324, that each of the identified values is of a data type (unsigned char) that is 1 byte in size. Also in the act 324, the vector code generator compares this 1 byte size to the size of a vector register channel, which is 4 bytes in this example. Responsive to the size of the data type of the identified values being less than the size of the vector register channels, the vector code generator executes the act 326. In the act 326, the vector code generator packs one data sequence with the first four identified values {0xa, 0x6e, 0x14, 0x78} and packs a second data sequence with last four identified values {0x1e, 0x82, 0x28, 0x8c}. Within the act 328, the vector code generator generates code to load the first channel of the vector register with the first data sequence and generates code to load the second channel of the vector register with the second data sequence. One example of this code includes the following instructions.

```
mov1int VecReg1.0 0x78146e0a:d
mov1int VecReg1.0 0x8c28821e:d
```

When executed, this generated code initializes VecReg1 with the identified values of {0xa, 0x6e, 0x14, 0x78, 0x1e, 0x82, 0x28, 0x8c}.

Each of the processes disclosed herein depict one particular sequence of acts in a particular example. The acts included in these processes may be performed by, or using, one or more computing devices specially configured as discussed herein. Some acts are optional and, as such, may be omitted in accord with one or more examples. Additionally, the order of acts can be altered, or other acts can be added, without departing from the scope of the systems and methods discussed herein. For example, each of the acts 300, 308, 316, and 324 need not be performed independently. In some embodiments, each of these acts is performed as part of a single, recursive initialization sequence. In these and other embodiments, the vector code generator matches target patterns to subsets of values within a large set of values (e.g., 64 or more values) specified by initialization syntax. Next, the vector code generator processes each subset based on its matching target pattern. Furthermore, as discussed above, in at least one example, the acts are performed on a particular, specially configured machine, namely a vector processing system configured according to the examples and embodiments disclosed herein.

Program Build Pipelines

Figure 4:
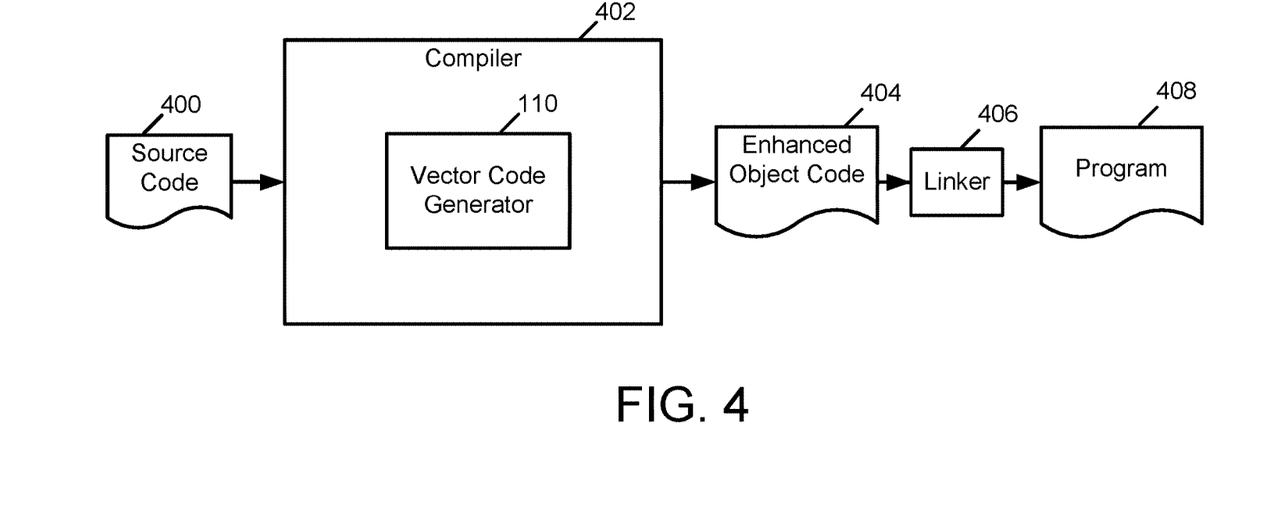
FIG. 4 illustrates a program build pipeline in accordance with an embodiment of the present disclosure.
Figure 5:
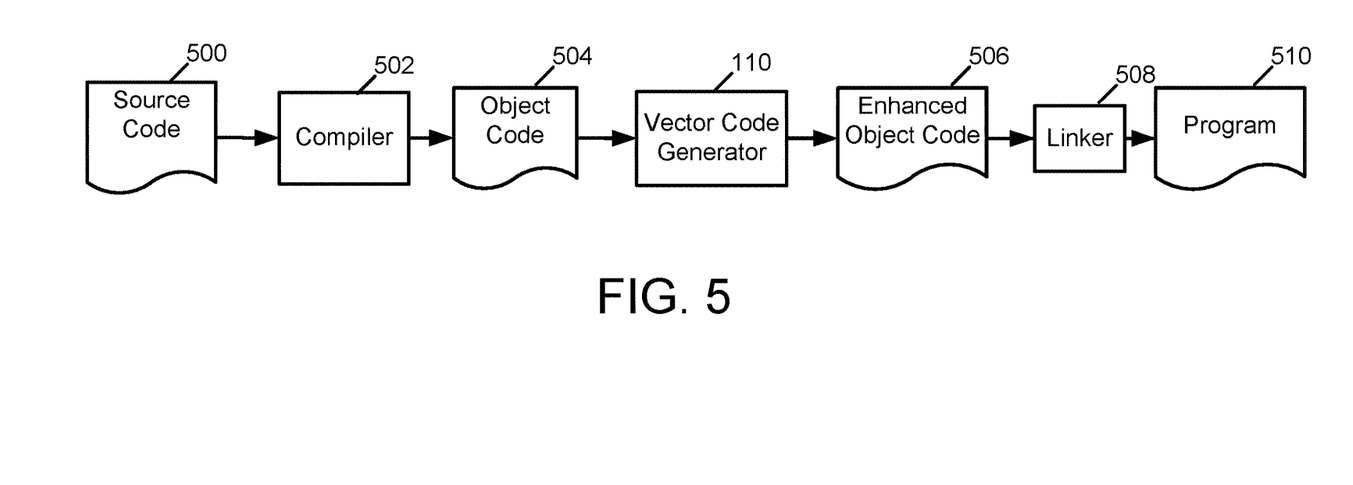
FIG. 5 illustrates another program build pipeline in accordance with an embodiment of the present disclosure.

FIGS. 4 and 5 illustrate various examples of a program build pipeline in accordance with various embodiments disclosed herein. As shown, FIG. 4 includes source code 400, a compiler 402, enhanced object code 404, a linker 406, and an executable program 408. The source code 400 may be written in any of a variety of human readable languages, such as C++. The compiler 402 includes a C++ compiler and a version of the vector code generator 110 that is configured to process initialization syntax written in C++. Upon receipt of a command to compile the source code 400, the compiler 402 compiles the source code 400. As part of this compilation process, the compiler 402 executes the vector code generator 110 and passes initialization syntax to the vector code generator 110 for processing. The enhanced vector initialization code generated by the vector code generator 110 is returned to the compiler 402 and output by the compiler along with the remainder of the compiled source code 400 within the enhanced object code 404. The linker 406 links any external references with the enhanced object code to generate the executable program 408.

FIG. 5 includes source code 500, a compiler 502, object code 504, the vector code generator 110, enhanced object code 506, a linker 508, and an executable program 510. The source code 400 may be written in any of a variety of human readable languages, such as C++. The compiler 502 includes a C++ compiler. Upon receipt of a command to compile the source code 500, the compiler 502 compiles the source code 500 into the object code 504. The version of the vector code generator 110 included in FIG. 5 is configured to process initialization syntax written in object code. Upon receipt of a command to process the object code 504, vector code generator 110 processes the object code to generate enhanced vector initialization code and outputs the enhanced object code 506, which include the enhanced vector initialization code along with the remainder of the object code 504. The linker 508 links any external references within the enhanced object code 506 to generate the executable program 510.

Further Example Embodiments

The following examples pertain to further embodiments, from which numerous permutations and configurations will be apparent.

Example 1 is a computing device comprising a memory storing a program including vector initialization syntax and at least one processor. The at least one processor is coupled to the memory and includes at least one vector register. The at least one processor is configured to scan the program to identify the vector initialization syntax, to identify a plurality of values specified within the vector initialization syntax, to match the plurality of values to at least one target pattern, and to generate, based on the at least one target pattern, enhanced vector initialization code configured to load the at least one vector register with the plurality of values.

Example 2 includes the subject matter of Example 1, wherein the enhanced vector initialization code comprises machine instructions including at least one of immediate operands and single instruction, multiple data instructions.

Example 3 includes the subject matter of Example 1 or Example 2, wherein the vector initialization syntax is coded in at least one of source code and object code.

Example 4 includes the subject matter of any of Examples 1-3, wherein the at least one processor is further configured to compile and link the program into an executable program comprising the enhanced vector initialization code.

Example 5 includes the subject matter of any of Examples 1-4, wherein the at least one vector register comprises a plurality of channels and the at least one target pattern comprises at least one of values forming an arithmetic progression, values within a limited range of a mean value, a plurality of repeating values, and values of a first size smaller than a second size of a channel of the plurality of channels.

Example 6 includes the subject matter of any of Examples 1-5, wherein the at least one target pattern comprises values forming an arithmetic progression and the at least one processor is configured to generate the enhanced vector initialization code at least in part by identifying a base value and a plurality of incremental values of the arithmetic progression, generating code to load each incremental value of the plurality of incremental values in a distinct and corresponding channel of the plurality of channels, and generating code to add the base value to each channel of the plurality of channels.

Example 7 includes the subject matter of any of Examples 1-6, wherein the at least one target pattern comprises values within a limited range of a mean value and the at least one processor is configured to generate the enhanced vector initialization code at least in part by identifying the mean value and a plurality of offset values, generating code to load each offset value of the plurality of offset values in a distinct and corresponding channel of the plurality of channels, and generating code to add the mean value to each channel of the plurality of channels.

Example 8 includes the subject matter of any of Examples 1-7, wherein the at least one target pattern comprises a plurality of repeating values and the at least one processor is configured to generate the enhanced vector initialization code at least in part by identifying the plurality of repeating values and one or more variant values, generating code to load, in each channel of the plurality of channels, a value repeating within the plurality of repeating values, and generating code to load the one or more variant values to one or more distinct, corresponding channels of the plurality of channels.

Example 9 includes the subject matter of any of 1-8, wherein the at least one target pattern comprises values of a first size smaller than a second size of a channel of the plurality of channels and the at least one processor is configured to generate the enhanced vector initialization code at least in part by packing the values of the first size into one or more data sequences of a size less than or equal to the second size and generating code to load the one or more data sequences into one or more channels of the plurality of channels.

Example 10 is a method of generating enhanced vector initialization code. The method comprises identifying vector initialization syntax within a program; identifying a plurality of values specified within the vector initialization syntax; matching the plurality of values with at least one target pattern; and generating, based on the at least one target pattern, enhanced vector initialization code configured to load at least one vector register of at least one processor with the plurality of values.

Example 11 includes the subject matter of Example 10, wherein generating the enhanced vector initialization code comprises generating machine instructions including at least one of immediate operands and single instruction, multiple data instructions.

Example 12 includes the subject matter of Example 10 or Example 11, wherein identifying the vector initialization syntax comprises identifying vector initialization syntax in at least one of source code and object code.

Example 13 includes the subject matter of any of Examples 10-12, further comprising compiling and linking the program into an executable program including the enhanced vector initialization code.

Example 14 includes the subject matter of any of Examples 10-13, wherein matching the plurality of values with the at least one target pattern comprises identifying the plurality of values as at least one of an arithmetic progression, a set of values within a limited range of a mean value, a set of values comprising a plurality of repeating values, and a set of values of a first size smaller than a second size of a channel of the at least one vector register.

Example 15 includes the subject matter of any of Examples 10-14, wherein matching the plurality of values with the at least one target pattern comprises identifying the plurality of values as comprising an arithmetic progression and generating the enhanced vector initialization code comprises identifying a base value and a plurality of incremental values of the arithmetic progression, generating code to load each incremental value of the plurality of incremental values in a distinct and corresponding channel of the at least one vector register, and generating code to add the base value to each channel of the at least one vector register.

Example 16 includes the subject matter of any of Examples 10-15, wherein matching the plurality of values with the at least one target pattern comprises identifying the plurality of values as comprising values within a limited range of a mean value and generating the enhanced vector initialization code comprises identifying the mean value and a plurality of offset values, generating code to load each offset value of the plurality of offset values in a distinct and corresponding channel of the at least one vector register, and generating code to add the mean value to each channel of the at least one vector register.

Example 17 includes the subject matter of any of Examples 10-16, wherein matching the plurality of values with the at least one target pattern comprises identifying the plurality of values as comprising a plurality of repeating values and generating the enhanced vector initialization code comprises identifying the plurality of repeating values and one or more variant values, generating code to load, in each channel of the at least one vector register, a value repeating within the plurality of repeating values, and generating code to load the one or more variant values to one or more distinct, corresponding channels of the at least one vector register.

Example 18 includes the subject matter of any of Examples 10-17, wherein matching the plurality of values with the at least one target pattern comprises identifying the plurality of values as comprising values of a first size smaller than a second size of a channel of the at least one vector register and generating the enhanced vector initialization code comprises packing the values of the first size into one or more data sequences of a size less than or equal to the second size and generating code to load the one or more data sequences into one or more channels of the at least one vector register.

Example 19 is a non-transient computer readable medium encoded with instructions that when executed by one or more processors cause a process for generating enhanced vector initialization code to be carried out. The process comprises scanning a program to identify vector initialization syntax; identifying a plurality of values specified within the vector initialization syntax; matching the plurality of values with at least one target pattern; and generating, based on the at least one target pattern, enhanced vector initialization code configured to load at least one vector register of at least one processor with the plurality of values.

Example 20 includes the subject matter of Example 19, wherein generating the enhanced vector initialization code comprises generating machine instructions including at least one of immediate operands and single instruction, multiple data instructions.

Example 21 includes the subject matter of Example 19 or Example 20, wherein scanning the program to identify the vector initialization syntax comprises identifying vector initialization syntax in at least one of source code and object code.

Example 22 includes the subject matter of any of Examples 19-21, wherein the process further comprises compiling and linking the program into an executable program comprising the enhanced vector initialization code.

Example 23 includes the subject matter of any of Examples 19-22, wherein matching the plurality of values with the at least one target pattern comprises identifying the plurality of values as at least one of an arithmetic progression, a set of values within a limited range of a mean value, a set of values comprising a plurality of repeating values, and a set of values of a first size smaller than a second size of a channel of the at least one vector register.

Example 24 includes the subject matter of any of Examples 19-23, wherein matching the plurality of values with the at least one target pattern comprises identifying the plurality of values as comprising an arithmetic progression and generating the enhanced vector initialization code comprises identifying a base value and a plurality of incremental values of the arithmetic progression, generating code to load each incremental value of the plurality of incremental values in a distinct and corresponding channel of the at least one vector register, and generating code to add the base value to each channel of the at least one vector register.

Example 25 includes the subject matter of any of Examples 19-24, wherein matching the plurality of values with the at least one target pattern comprises identifying the plurality of values as comprising values within a limited range of a mean value and generating the enhanced vector initialization code comprises identifying the mean value and a plurality of offset values, generating code to load each offset value of the plurality of offset values in a distinct and corresponding channel of the at least one vector register, and generating code to add the mean value to each channel of the at least one vector register.

Example 26 includes the subject matter of any of Examples 19-25, wherein matching the plurality of values with the at least one target pattern comprises identifying the plurality of values as comprising a plurality of repeating values and generating the enhanced vector initialization code comprises identifying the plurality of repeating values and one or more variant values, generating code to load, in each channel of the at least one vector register, a value repeating within the plurality of repeating values, and generating code to load the one or more variant values to one or more distinct, corresponding channels of the at least one vector register.

Example 27 includes the subject matter of any of Examples 19-26, wherein matching the plurality of values with the at least one target pattern comprises identifying the plurality of values as comprising values of a first size smaller than a second size of a channel of the at least one vector register and generating the enhanced vector initialization code comprises packing the values of the first size into one or more data sequences of a size less than or equal to the second size and generating code to load the one or more data sequences into one or more channels of the at least one vector register.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

The invention claimed is:

1. A computing device comprising:
    a memory storing a program including vector initialization syntax; and
    at least one processor coupled to the memory and comprising at least one vector register comprising a plurality of channels having a number of channels in total, the at least one processor being configured to
        scan the program to identify the vector initialization syntax,
        identify a plurality of values specified within the vector initialization syntax, the plurality of values having a number of values equal to or greater than the number of channels and comprising at least two unequal values,
        match the plurality of values to at least one target pattern comprising values forming an arithmetic progression, and
        generate, based on the at least one target pattern, enhanced vector initialization code configured to load the at least one vector register with the plurality of values, wherein the at least one vector register is loaded using a number of instruction set architecture (ISA) instructions that is less than the number of channels, to generate comprising to
        identify a base value and a plurality of incremental values of the arithmetic progression,
        generate code to load each incremental value of the plurality of incremental values in a distinct and corresponding channel of the plurality of channels, and
        generate code to add the base value to each channel of the plurality of channels.

2. The computing device of claim 1, wherein the enhanced vector initialization code comprises immediate operands and/or single instruction, multiple data instructions.

3. The computing device of claim 1, wherein the vector initialization syntax is coded in source code and/or object code.

4. The computing device of claim 1, wherein the at least one processor is further configured to compile and link the program into an executable program comprising the enhanced vector initialization code.

5. The computing device of claim 1, wherein the at least one target pattern further comprises values within a limited range of a mean value, a plurality of repeating values, and/or values of a first size smaller than a second size of a channel of the plurality of channels.

6. The computing device of claim 5, wherein the at least one target pattern comprises values within a limited range of a mean value and the at least one processor is further configured to generate the enhanced vector initialization code at least in part by identifying the mean value and a plurality of offset values, generating code to load each offset value of the plurality of offset values in a distinct and corresponding channel of the plurality of channels, and generating code to add the mean value to each channel of the plurality of channels.

7. The computing device of claim 5, wherein the at least one target pattern comprises a plurality of repeating values and the at least one processor is further configured to generate the enhanced vector initialization code at least in part by identifying the plurality of repeating values and one or more variant values, generating code to load, in each channel of the plurality of channels, a value repeating within the plurality of repeating values, and generating code to load the one or more variant values to one or more distinct, corresponding channels of the plurality of channels.

8. The computing device of claim 5, wherein the at least one target pattern comprises values of a first size smaller than a second size of a channel of the plurality of channels and the at least one processor is further configured to generate the enhanced vector initialization code at least in part by packing the values of the first size into one or more data sequences of a size less than or equal to the second size and generating code to load the one or more data sequences into one or more channels of the plurality of channels.

9. A method of generating enhanced vector initialization code for a vector register comprising a plurality of channels having a number of channels in total, the method comprising:
    identifying, by at least one processor, vector initialization syntax within a program;
    identifying, by the at least one processor, a plurality of values specified within the vector initialization syntax, the plurality of values having a number of values equal to or greater than the number of channels and comprising at least two unequal values;
    matching, by the at least one processor, the plurality of values with at least one target pattern comprising values forming an arithmetic progression; and
    generating, by the at least one processor based on the at least one target pattern, enhanced vector initialization code configured to load at least one vector register of at least one processor with the plurality of values, wherein the at least one vector register is loaded using a number of instruction set architecture (ISA) instructions that is less than the number of channels and generating comprises
        identifying a base value and a plurality of incremental values of the arithmetic progression,
        generating code to load each incremental value of the plurality of incremental values in a distinct and corresponding channel of the plurality of channels, and
        generating code to add the base value to each channel of the plurality of channels.

10. The method of claim 9, wherein generating the enhanced vector initialization code comprises generating instructions comprising immediate operands and/or single instruction, multiple data instructions.

11. The method of claim 9, wherein identifying the vector initialization syntax comprises identifying vector initialization syntax in source code and/or object code.

12. The method of claim 9, further comprising compiling and linking the program into an executable program including the enhanced vector initialization code.

13. The method of claim 9, wherein matching the plurality of values with the at least one target pattern further comprises identifying the plurality of values as comprising values within a limited range of a mean value and generating the enhanced vector initialization code further comprises identifying the mean value and a plurality of offset values, generating code to load each offset value of the plurality of offset values in a distinct and corresponding channel of the at least one vector register, and generating code to add the mean value to each channel of the at least one vector register.

14. The method of claim 9, wherein matching the plurality of values with the at least one target pattern further comprises identifying the plurality of values as comprising a plurality of repeating values and generating the enhanced vector initialization code further comprises identifying the plurality of repeating values and one or more variant values, generating code to load, in each channel of the at least one vector register, a value repeating within the plurality of repeating values, and generating code to load the one or more variant values to one or more distinct, corresponding channels of the at least one vector register.

15. The method of claim 9, wherein matching the plurality of values with the at least one target pattern further comprises identifying the plurality of values as comprising values of a first size smaller than a second size of a channel of the at least one vector register and generating the enhanced vector initialization code further comprises packing the values of the first size into one or more data sequences of a size less than or equal to the second size and generating code to load the one or more data sequences into one or more channels of the at least one vector register.

16. A computer program product including one or more non-transitory machine-readable mediums encoded with instructions that when executed by one or more processors cause a process to be carried out for generating enhanced vector initialization code for a vector register comprising a plurality of channels having a number of channels in total, the process comprising:
  scanning a program to identify vector initialization syntax;
  identifying a plurality of values specified within the vector initialization syntax, the plurality of values having a number of values equal to or greater than the number of channels and comprising at least two unequal values;
  matching the plurality of values with at least one target pattern comprising values forming an arithmetic progression; and
  generating, based on the at least one target pattern, enhanced vector initialization code configured to load at least one vector register of at least one processor with the plurality of values, wherein the at least one vector register is loaded using a number of instruction set architecture (ISA) instructions that is less than the number of channels and generating comprises
    identifying a base value and a plurality of incremental values of the arithmetic progression,
    generating code to load each incremental value of the plurality of incremental values in a distinct and corresponding channel of the plurality of channels, and
    generating code to add the base value to each channel of the plurality of channels.

17. The computer program product of claim 16, wherein generating the enhanced vector initialization code comprises generating instructions comprising immediate operands and/or single instruction, multiple data instructions.

18. The computer program product of claim 16, wherein scanning the program to identify the vector initialization syntax comprises identifying vector initialization syntax in source code and/or object code.

19. The computer program product of claim 16, wherein the process further comprises compiling and linking the program into an executable program comprising the enhanced vector initialization code.

20. The computer program product of claim 16, wherein matching the plurality of values with the at least one target pattern further comprises identifying the plurality of values as comprising values within a limited range of a mean value and generating the enhanced vector initialization code further comprises identifying the mean value and a plurality of offset values, generating code to load each offset value of the plurality of offset values in a distinct and corresponding channel of the at least one vector register, and generating code to add the mean value to each channel of the at least one vector register.

21. The computer program product of claim 16, wherein matching the plurality of values with the at least one target pattern further comprises identifying the plurality of values as comprising a plurality of repeating values and generating the enhanced vector initialization code further comprises identifying the plurality of repeating values and one or more variant values, generating code to load, in each channel of the at least one vector register, a value repeating within the plurality of repeating values, and generating code to load the one or more variant values to one or more distinct, corresponding channels of the at least one vector register.

22. The computer program product of claim 16, wherein matching the plurality of values with the at least one target pattern further comprises identifying the plurality of values as comprising values of a first size smaller than a second size of a channel of the at least one vector register and generating the enhanced vector initialization code further comprises packing the values of the first size into one or more data sequences of a size less than or equal to the second size and generating code to load the one or more data sequences into one or more channels of the at least one vector register.

* * * * *